March 9, 1948. A. S. MULLGARDT 2,437,330
VARIABLE INCIDENCE WING CONTROL FOR AIRCRAFT OF THE
ROTARY WING OR AIRPLANE SUSTAINED TYPE
Filed Jan. 24, 1944 7 Sheets-Sheet 1

INVENTOR.
ALEXANDER S. MULLGARDT
BY George B. White
ATTORNEY

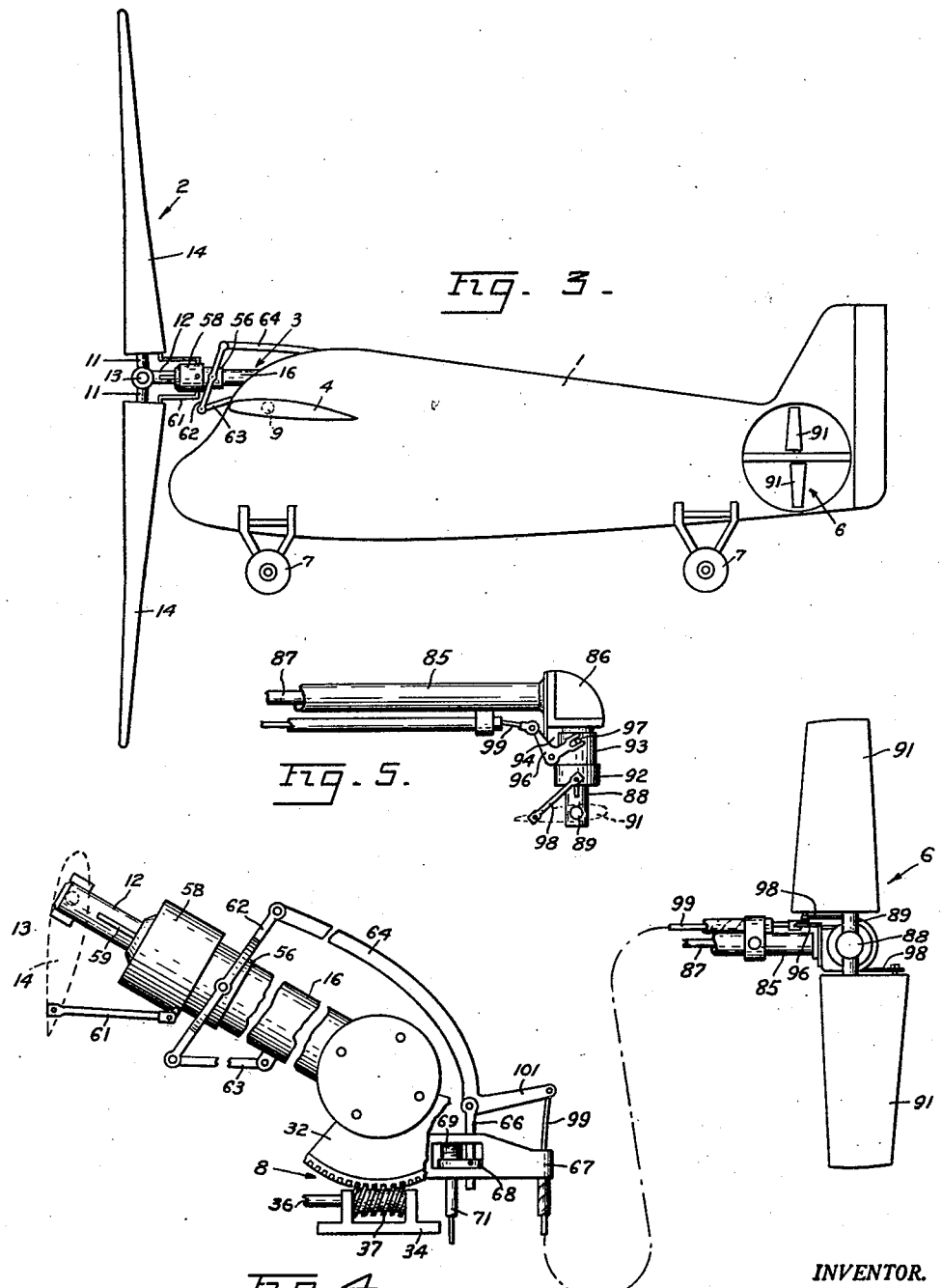

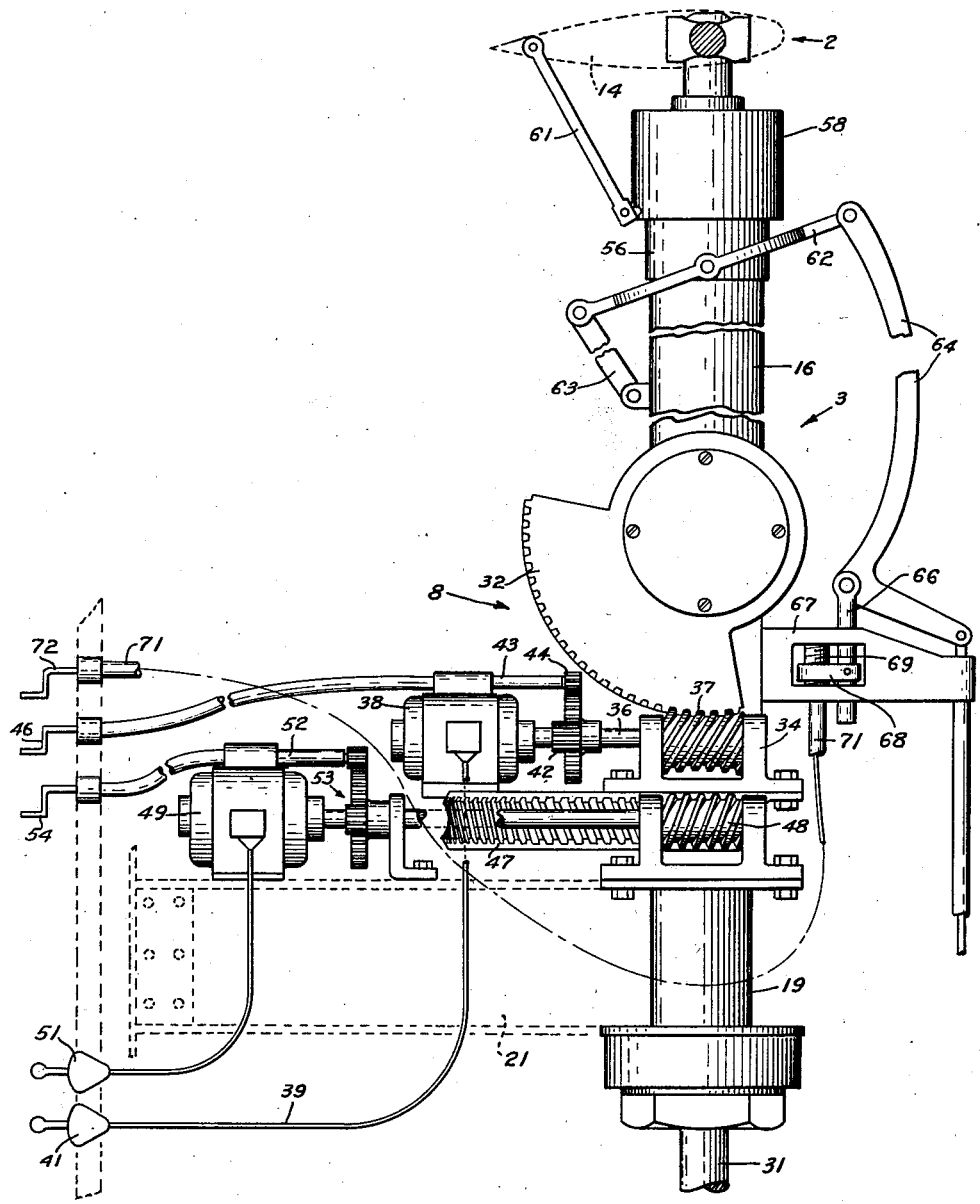

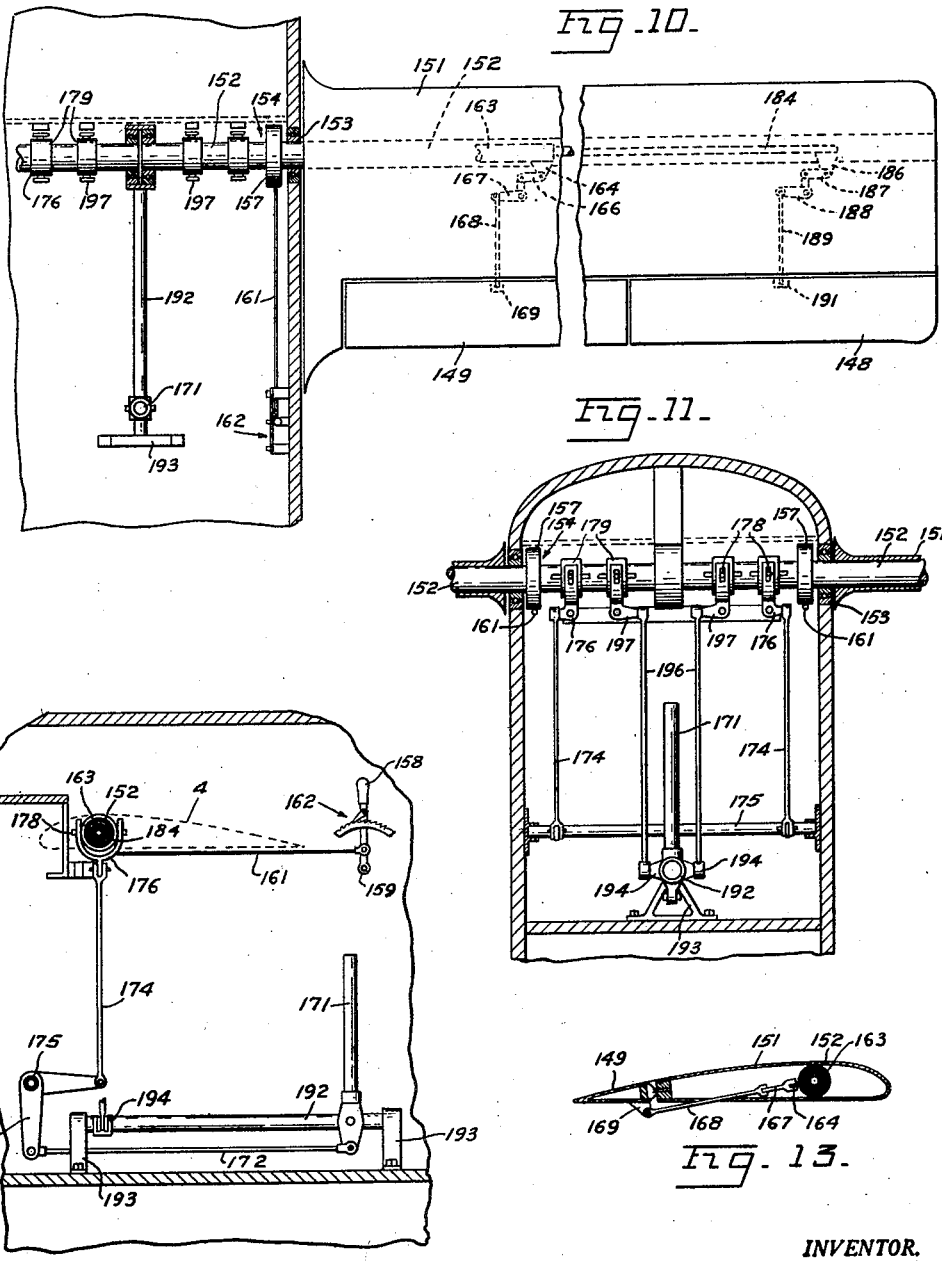

March 9, 1948. A. S. MULLGARDT 2,437,330
VARIABLE INCIDENCE WING CONTROL FOR AIRCRAFT OF THE
ROTARY WING OR AIRPLANE SUSTAINED TYPE
Filed Jan. 24, 1944 7 Sheets-Sheet 7
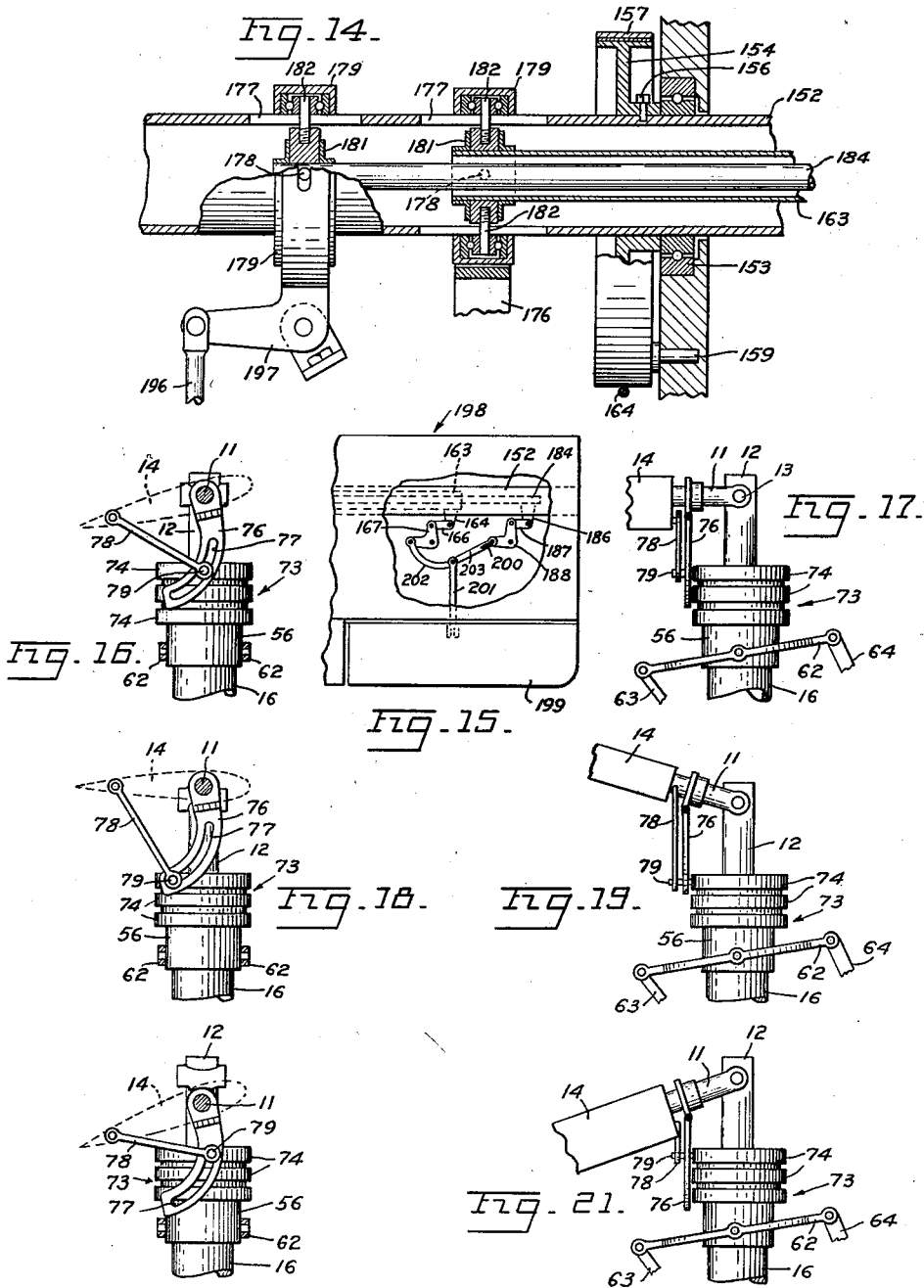
INVENTOR.
ALEXANDER S. MULLGARDT
BY George B. White
ATTORNEY Patented Mar. 9, 1948

2,437,330

UNITED STATES PATENT OFFICE 2,437,330

VARIABLE INCIDENCE WING CONTROL FOR AIRCRAFT OF THE ROTARY WING OR AIRPLANE SUSTAINED TYPE

Alexander S. Mullgardt, Altadena, Calif.

Application January 24, 1944, Serial No. 519,476

4 Claims. (Cl. 244—48)

This invention relates to aircrafts and particularly to aircrafts having rotating lifting blades.

Aircrafts having rotating lifting blades heretofore had many defects and limitations which prevented their wide use for general purposes. Some of these defects and disadvantages are the inherent complexity of control in flight; unstable characteristics which cause the aircraft to be thrown into attitudes of unstable accelerated flight from both accelerated and unaccelerated powered flight, and the forces at the disposal of the pilot to recover are practically limited; low efficiency of the rotor; continuous diversion of a considerable proportion of available engine power for driving mechanical counter-torque means such as a tail rotor to overcome the tendency of the aircraft to turn about its main rotor axis; the limitation imposed by the maximum ratio of advanced speed to the rotor tip speed; the limitation on the maximum attainable velocity; the limitation of rotor efficiency by reason of the limitation on the maximum velocity of air through the disc of rotation of the rotor inherent in small tilt of the rotor in the direction of advance or forward flight; the disproportionate increase of the drag by reason of the relative angle of tilt of the fuselage to the same relative angle of tilt as its rotor, and many other functional and structural disadvantages.

One of the primary objects of this invention is to improve the efficiency, stability and controllability of the type of aircraft having rotating lifting blades.

Other objects of the invention involve the provision in such aircraft of a tiltable rotor for the most efficient use of said rotor for translational and directional movement; controllable wings to coact with said rotor in its various positions for rendering the aircraft stable through a considerable range of attitudes; automatically controllable blades on the rotor as well as a mechanism to adjust the angles of the blades of the rotor to suit desired flight conditions; automatic variation of the force developed by counter-torque means with the variation of the blade angles of said rotor; and means for mounting and controlling said rotor and said wings and said counter torque means.

More specifically in my invention the object is to provide a tiltable rotor which can be used with greater propulsive efficiency, individually adjustable wings to establish the optimum lift and drag ratio for all attitudes of the rotor and the aircraft, and means for the adjustment of the various control adjustments of the rotor, wings and counter-torque means which can be controlled by the pilot simply and with reasonably small control stick or control lever forces.

The invention further contemplates the provision of wings for an aircraft of the rotating lifting blade type which wings are mounted and controlled so that the wings may controllably take any part of the lift during powered or unpowered flight according to the attitude and direction of flight and according to the angle of the axis of rotation of the rotor with respect to the fuselage of the aircraft, and which can be feathered into the relative wind or tilted at will forward or back from the feathered position with the result of a corresponding tendency of movement of the entire aircraft.

Still another object of this invention is to provide automatic means to vary the angles of the blades of the rotor of such craft to counteract tendencies for variation of the blades away from the mean coning angle during their cycles of rotation and to maintain a substantially constant lift of each blade during its entire revolution even when the relative wind is not coaxial with the rotor.

I am aware that some changes may be made in the general arrangements and combinations of the several devices and parts, as well as in the details of the construction thereof without departing from the scope of the present invention as set forth in the following specification, and as defined in the following claims; hence I do not limit my invention to the exact arrangements and combinations of the said device and parts as described in the said specification, nor do I confine myself to the exact details of the construction of the said parts as illustrated in the accompanying drawings.

With the foregoing and other objects in view, which will be made manifest in the following detailed description reference is had to the accompanying drawings for the illustrative embodiment of the invention, wherein:

Fig. 3 is a side view of said aircraft showing the rotor tilted to a forward propeller position.

Fig. 4 is a detail view of the main rotor pylon in tilted position, showing the co-related pitch varying mechanisms for the main rotor blades and for the counter-torque rotor blades.

Fig. 5 is a detail view showing the mounting and adjusting means of the counter-torque rotor.

Fig. 6 is a partly diagrammatic side view of the mounting and adjusting means for the main rotor and its pylon.

Fig. 10 is a fragmental, partly sectional plane view of the aircraft and of one of the wings, having aileron flaps, showing the wing and aileron controls.

Fig. 11 is a cross sectional view of the fuselage of the aircraft showing the wing and aileron controls therein.

Fig. 12 is a fragmental sectional view of the fuselage showing a side view of diving controls for the aileron-flaps.

Fig. 13 is a sectional view of a wing showing the aileron-flap controls therein.

Fig. 14 is a sectional detail view of connection of the brake to the spar and the connections of the flap controls to the respective control shaft and tube.

Fig. 15 is a fragmental detail plane view of a wing with a single aileron flap showing the connection of the control to said single flap.

Fig. 16 is a front view of another form of blade pitch control for the main rotor, shown in condition at the point of the cycle of rotation where the flapping angle is at, or near zero.

Fig. 17 is a side view of said blade pitch control in said condition.

Fig. 18 is a front view of said blade pitch control in position at the point of the cycle of rotation where the flapping angle is at maximum positive for normal flight conditions.

Fig. 19 is a side view of said blade pitch control in said position of Fig. 18.

Fig. 20 is a front view of said blade pitch control at the point in the cycle of rotation where the flapping angle is at maximum negative for normal flight conditions, and Fig. 21 is a side view of said blade pitch control at the point described in Fig. 20.

Figure 1:
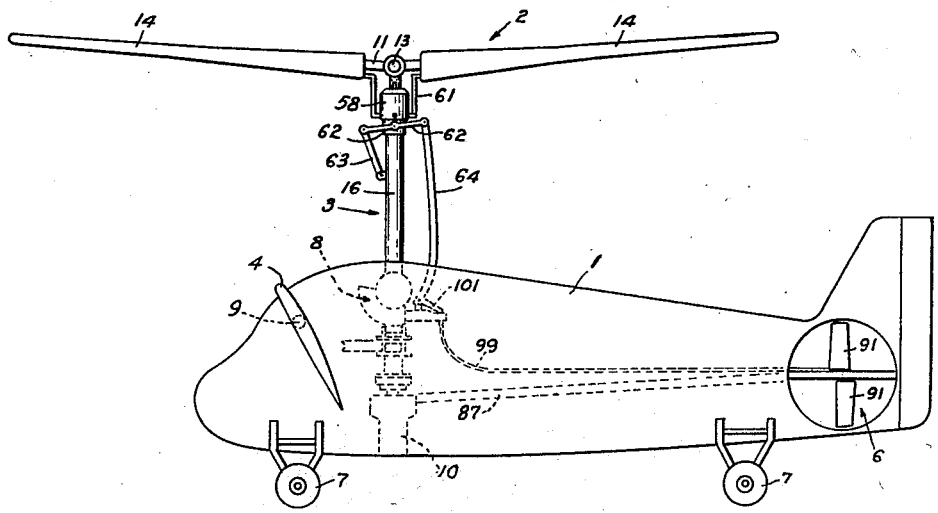
Fig. 1 is a side view of an aircraft showing the relative position of the rotor, the wings and the counter torque-means, the rotor being in vertical position with respect to the longitudinal plane axis.
Figure 2:
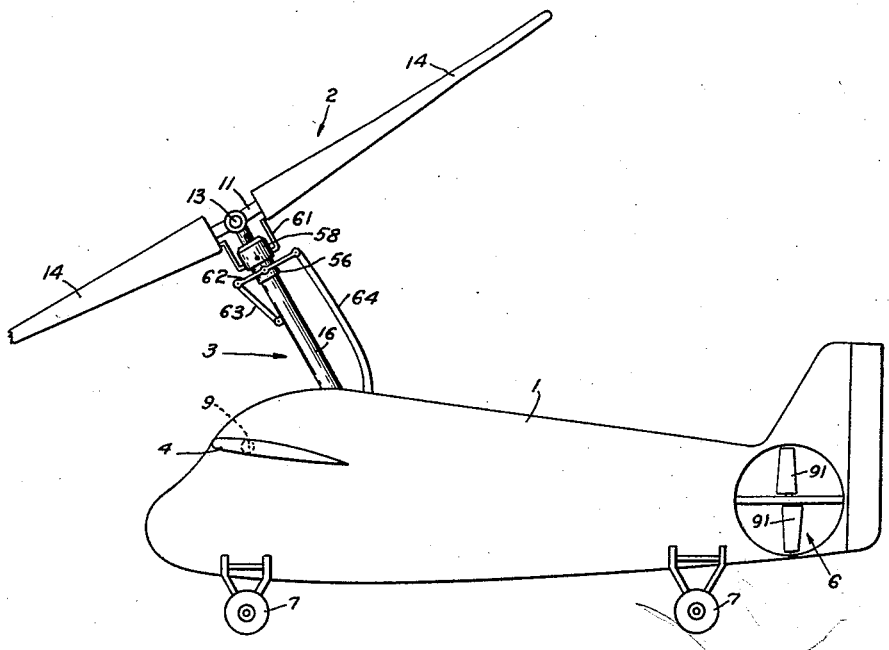
Fig. 2 is a side view of said aircraft showing the rotor tilted.

In Figs. 1, 2 and 3 I have illustrated an aircraft having a fuselage 1, above which is a rotor 2 supported on a pylon 3, and which has a wing 4 in this form shown forward and above the center of gravity of the aircraft. At the tail of the fuselage 1 is a counter-torque mechanism, in this illustration a tail rotor 6 for counteracting the torque of the rotor on the fuselage 1. The aircraft may be provided with usual landing wheels 7 or hull or pontoons, and have the usual interior arrangement suitable for the purpose or use for which the aircraft is designed. The pylon 3 is supported on an adjusting mechanism and support shown in Fig. 6 and denoted in its entirety by the reference numeral 8. This adjusting support 8 has in it a transmission which transmits power from an engine 10 in the fuselage 1, shown in Fig. 1, through suitable driving shafts to rotate the rotor 2. The adjustment of the pylon is both for tilting the axis of rotation of the rotor 2 and for turning the pylon around the vertical axis of the fuselage, the latter adjustment is to be used principally to effect a sidewise tilting of the rotor axis during hovering or vertical climb and powered descent in order to balance out the horizontal force developed by the counter-torque means, as well as any rolling moment about the longitudinal axis of the craft due to the relative locations of the rotor and the counter-torque means with respect to the center of gravity of the craft. The semi-span wing 4 on each side of the fuselage 1 is rigidly mounted on its individual spar 9 which latter is cantilevered from the fuselage on antifriction bearings so as to be rotatable about its axis and suitably controlled and held in adjusted positions at any desired angle with respect to the fuselage axis.

In Fig. 1 is shown the relative position of the rotor 2 and the wings 4 for a thrust axis normal to the fuselage axis, the thrust axis passing substantially through the center of gravity of the aircraft, in accelerated or unaccelerated flight with power and relative wind direction coaxial with the axis of thrust. It is to be noted that the center of drag in this position is assumed aft of the thrust axis and tends to tilt the fuselage with the rotor into a nose high position, therefore in order to keep the craft from moving backward the wings must be inclined so as to present a negative angle of attack with respect to the relative wind from the rotor, and thus to develop a horizontal force equal and opposite to that due to the rearward inclination of the rotor. To fully satisfy this condition the algebraic sum of the moments due to the suspended weight, the drag, and the wing force about the center of thrust from the rotor must equal zero. The fuselage axis may be held horizontal by tilting the rotor axis itself slightly forward and coincidentally inclining the wings so as to present a positive angle of attack with respect to the relative wind from the rotor, and thus to develop a horizontal force equal and opposite to that due to the forward inclination of the rotor thrust axis. In this case the thrust axis does not pass through the center of gravity of the craft but slightly to the rear thereof; therefore the rotor thrust imparts a diving moment which is balanced by opposing moments from the drag and wing forces about the center of rotor thrust so that the algebraic sum of the moments is again made equal to zero, but the fuselage axis is now horizontal. Within reasonable limits the fuselage axis may be made to assume a wide variety of inclinations during hovering, vertical climb or powered descent by tilting the rotor and inclining the wings to suitable relative positions; or conversely, the fuselage axis may be maintained at any desired inclination for a reasonably wide variation in the location of the center of gravity of the craft. This feature is important for practical reasons because it is well known that the center of gravity in aircraft normally does shift considerably under varying load conditions.

In Fig. 2 is illustrated the relative position of the rotor 2 and of the wing 4 for horizontal flight, and climbing or diving flight. The rotor 2 is tilted forward less than 90 degrees from its vertical thrust position. The wings 4 are turned and held in position to determine the horizontal or climbing or diving attitude of the aircraft in combination with powered rotor thrust which then is contributing a sufficiently large horizontal component to overcome the total drag of the craft plus a vertical component equal to that proportion of the total weight not carried by the wings. For unaccelerated translational flight the moment developed by the rotor about the center of gravity must balance those of opposite sign and due to the resultant aerodynamic force on the wings, and the parasite drag force, about the center of gravity. Adjustment of either engine throttle, or rotor tilt, or rotor-blade pitch, or wing incidence, or all four in various combinations may be employed to achieve the desired attitude of flight. However, normally when the rotor has been tilted to some predetermined angle, thereafter manipulation of the wing controls and the engine throttle are sufficient for maneuvering the craft in either accelerated or unaccelerated translational flight. It is to be noted that the center of tilt is above and substantially on the vertical axis of the center of gravity of the aircraft. In this position the torque reaction caused by the rotor 2 may be absorbed either by a combination of the counter-torque mechanism 6 and the differential lift of the wings 4 or by a combination of the differential lift of the wings and the vertical tail surface as the translational air velocity becomes great enough to make such surfaces effective. By using the differential wing lift and the vertical-tail moments about the center of gravity to counteract the torque the power required for operating the tail rotor 6 can be utilized for increasing the power applied to the rotor 2 for forward propulsion. The net wing lift in this position is substantially vertical with respect to the fuselage axis and is forward of the center of gravity of the aircraft. As shown in Fig. 2 the wings 4 are located well forward of the center of gravity; however, except for the case where the wing area is quite small in relation to the disc area of the rotor and hence the principal lift is at all times generated by the rotor with consequent small feasible angles of maximum rotor tilt, the center of lift of the wing is proportionately much closer to the vertical axis through the center of gravity than as shown.

In Fig. 3 is illustrated the rotor position in full forward propulsion, the plane of rotation being at right angles to its original position and the rotor acting only as a tractor propeller. The wings 4 are set for normal forward flight or for diving or climbing attitude. The torque reaction for the direction of rotor rotation shown is absorbed by setting the wing 4 shown to a greater degree of incidence than that of the wing 4 on the side not shown in this figure.

A large variety of balanced translational flight conditions can be achieved by other combinations of the relative angular positions of the rotor 2 and the wings 4. In all such conditions of flight the inclination of the fuselage axis can be varied by changing the pitch of the blades of the rotor 2 or by changing the angle of incidence of the wings 2 or the speed of rotation of the rotor, or all of them. The aircraft can also be maneuvered by differential adjustment of the wing angles using them as control surfaces and by manipulation of the rudder.

Figure 7:
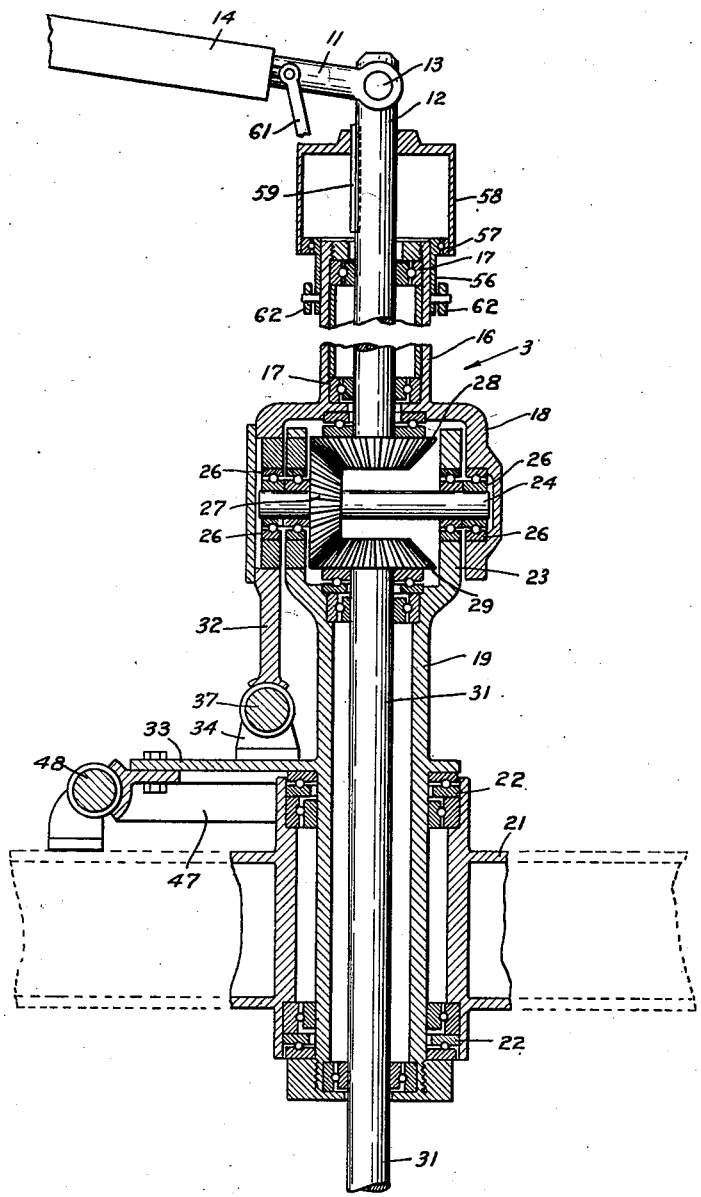
Fig. 7 is a sectional view of the adjustable pylon of the main rotor.

In this illustrative embodiment the rotor 2 is shown with two so-called articulated lifting blades. There may be however, any desired number and any other type of blades used in my combination. Spars 11 are pivoted to a rotor shaft 12 by means of pivot pins 13 on an axis transverse to the axis of the rotor shaft 12. This permits the spars 11 to cone when the rotor is rotated according to the relation between the lift on the blades and the centrifugal forces on the rotor 2. On each spar 11 is journaled a rotor blade 14 formed in the shape of suitable airfoil. Each blade 14 controllably turns on its spar 11 as an axis for changing its angle of incidence with respect to the plane of rotation of the rotor 2. The rotor shaft 12 is journaled in the tiltable housing section 16 of the pylon 3 on suitable antifriction bearings 17 as shown in Fig. 7. The lower end of the tiltable pylon section 16 is enlarged into an outer transmission housing 18. The lower pylon section 19 is mounted on the frame 21 of the aircraft on suitable thrust bearings 22 so that the entire pylon can be turned for adjustment around the axis of the lower pylon. The upper end of the lower pylon section 19 is formed into a transmission housing 23. A pivot shaft 24 extends transversely through the outer transmission housing 18 and the inner transmission housing 23 and is mounted in suitable antifriction bearings 26 in said housings 18 and 23 so that the tiltable pylon section 16 can be tilted around the pivot shaft 24 and around the inner housing 23 on the top of the lower pylon section 19.

The rotor drive shaft 12 is rotatably mounted in the tiltable pylon section 16 so as to tilt with said section. On the pivot shaft 24 in the transmission housing 23 is a transmission gear 27. A bevel gear 28 on the lower end of the drive shaft 12 is engaged with said transmission gear 27. A driving gear 29 on the upper end of a lower drive shaft section 31 is also in engagement with said transmission gear 27 so that rotor drive shaft 12 is driven at all tilted angles of the pylon.

The tiltable pylon section 16 is adjusted and held in adjusted vertical or tilted positions by means of a segmental gear 32 extended from the outer transmission housing 18 in a plane substantially parallel with the axis of the lower pylon section 19. A flange 33 extends from the lower pylon section 19. In bearing brackets 34 on this flange 33 is journaled the shaft 36 of a pylon tilting worm 37 in mesh with the teeth of the segmental gear 32. The segmental gear 32 is concentric with the pivot axis of the tiltable pylon section 16 so that when the worm 37 is rotated it turns the segmental gear 32 which then turns the outer transmission housing 18 and thus turns the upper section of the pylon to a selected straight up or tilted position as desired. The worm shaft 36 is suitably coupled to an electric motor 38 also mounted on the pylon flange 33 as shown in Fig. 6. It is understood that other types of motor, such as hydraulic motor may be used. The tilting motor 38 is controlled by a suitable electric circuit indicated by wires 39 and by a manually operable switch indicated at 41 suitable for controlling the motor 38 in either direction according to the direction of movement required to adjust the tiltable pylon section 16. On the worm shaft 36 is a small gear 42. A flexible drive cable 43 mounted on the top of the motor 38 is connected by another gear 44 to the small gear 42 so that rotation can be transmitted from the drive cable 43 to the gear 42 and to the worm 37 for tilting the pylon remotely and independently of the motor 38, and also to transmit rotation from the worm 37 to the flexible drive cable 43 for indicating the plyon position at a remote point where it may be observed by the pilot. The remote end of the flexible drive cable 43 extends to a point conveniently near to the pilot in the aircraft and has a crank 46 thereon for manual adjustment of pylon angle. A geared or similar indicator may be provided at the crank end of the flexible drive cable 43 to indicate the angle of the pylon position.

On the pylon flange 33 is fixed a ring gear 47 in mesh with a pylon turning worm 48 as shown in Figures 6 and 7. A pylon turning motor 49 is suitably mounted on the frame of the aircraft and has its shaft coupled with the shaft of the turning worm 48 for the turning of the lower pylon section 19, and the entire pylon therewith, around the pylon axis. This turning motor 49 is controlled by a manually actuated switch 51 similarly to the motor control heretofore described. A flexible drive cable 52 secured on the turning motor 49 is connected by gearing 53 to the turning worm shaft for transmitting rotation to and from the turning worm 48. A crank 54 on the remote end of this flexible drive cable 52 is located conveniently near the pilot. This crank end of the flexible drive may be so geared as to indicate to the pilot the angle of turn of the pylon.

The mean pitch of the airfoil of the blade is adjustable to various attitudes and in accordance with the tilting of the pylon. An illustrative embodiment of a manner of accomplishing such adjustment and its connection to one of the blades is shown in Figures 4, 6, and 7. In this form a sliding collar 56 is provided on the outside of the top end of the upper pylon section 16. The top end of this collar 56 has thereon the inner race of an anti-friction bearing 57. On the outer race of the ball bearing 57 is fixed a pitch control cap 58 slidably keyed at 59 to the rotor shaft 12. A pitch control link 61 is pivoted at one end to the skirt of the cap 58 and at its other end to the rotor blade 14. In this form the link 61 is connected near the trailing edge of the airfoil section of the rotor blade 14. When the cap 58 is shifted outwardly on the pylon section 16, the link 61 turns the blade 14 around the rotor spar 11 so as to decrease the pitch of the blade 14 and vice versa. There is such a link 61 connected to each of the other blades of the rotor, as shown in Fig. 3. The cap 58 rotates with the rotor shaft 12 on its bearing 57. The adjustment is accomplished through a yoke 62 journaled on both sides of the sliding collar 56 and extending to opposite sides of the pylon in the plane of its tilt. One end of the yoke 62 is pivoted to an end of a link 63. The other end of this adjusting link 63 is pivoted to the upper pylon section 16. The other end of the yoke 62 is pivoted to a lever 64. The lower end of the lever 64 is pivoted to an arm 66 guided in a bracket 67 on the lower pylon section 19 so as to be pivotally restrained when the upper section is tilted. The arm 66 is held on a travelling nut 68 in said bracket 67. A turn screw 69 is journaled in the bracket 67, and the nut 68 moves on it parallel with the axis of the lower pylon section 19 when the screw 69 is turned. The screw 69 is turned by means of a flexible drive 71 extending to a place convenient to the pilot and terminating in a suitable handle or crank 72. For initial adjustment of the pitch of the rotor blades 14 the screw 69 is turned and according to the direction of turning the nut 68 thereon travels up or down in the bracket 67. The arm 66 is raised or lowered with the nut 68 raising or lowering the lever 64. When the lever 64 is raised toward the rotor 2 it slides the collar 56 toward the rotor 2. The cap 58 slides in the same direction and pushes the control link 61 so as to turn the blade 14 and decrease its pitch. The turning of the screw 69 in the opposite direction pulls the collar 56 and the cap 58 away from the rotor 2 and pulls the control link 61 for increasing the pitch of the blade 14. Once so adjusted the blades are held at the adjusted mean pitch while the pylon remains in the same attitude. When the upper pylon section 16 is tilted forward from the adjusted position the lever 64 is automatically swung around its pivot and due to the holding effect of the adjusting link 63 the yoke 62 pulls the collar 56 and the cap 58 away from the rotor 2 so as to increase the pitch of the blade 14 in proportion to the angle of tilt and thereby to obtain a more favorable propulsive attitude for rotor 2. The pitch of the blades is correspondingly decreased when the pylon is returned toward its straight position.

Another form of pitch adjustment for the rotor blades 14 is shown in Figures 16, 17, 18, 19, 20 and 21. In this form in addition to the previous adjustments there is an automatic adjustment of the individual blade incidence angle to counteract cyclic coning or flapping of the blades. This automatic adjustment will substantially maintain constant lift throughout the cycle of the blade rotation. The cyclic deviation in coning is caused by the varying of the lift on the blades at different parts in their cycle of rotation. When the plane of rotation of the rotor is other than normal to the relative wind direction then the lift on the airfoil of the blade 14 which is on that part of its cycle approaching into the direction of flight is increased due to the relative wind plus its rotational speed, and the increased lift increases the upward tilt of the blade 14 around its spar pivot. Normally the blades tilt or cone upwardly according to the lift and centrifugal forces exerted thereon. During the cycle of rotation however where the blade moves toward the direction of flight its coning is increased and after passing the foremost position and during the rearward semicycle of blade rotation the decrease of lift depresses the blade and decreases its coning. By the adjustment shown in this form the pitch of the blade is changed automatically tending to compensate for the variation of lift during the various differential parts of the cycle of blade rotation. A control cap 73 in this form is provided with a series of parallel rings 74. Each of these rings 74 is rotatable on the cap 73 on suitable anti-friction-bearings, the inner races of which are fixed on the cap 73 so as to prevent the rings from sliding on the cap 73. There are as many rings 74 as blades 14. From each spar 11 is extended an arcuate arm 76 to one of the rings 74. Near the end of each arm 76 is an arcuate slot 77. A control link 78 is pivoted at one end to each of the blades 14 near the trailing edge of the same. The other end of each link 78 is pivoted on a pivot 79 which latter extends through said slot 77 and is secured to the ring 74. The adjustment accomplished by this mechanism is such that the change of the blade pitch is substantially proportionate to the relative lift at each cyclic position. The cap 73 with the rings 74 thereon is adjusted for general changing of the mean pitch of all the blades as heretofore described in connection with the pitch control cap 58.

This automatic cyclic individual blade control is illustrated herein under various conditions and for the sake of simiplicity the mean coning angle is here assumed equal to zero. In Figures 16 and 17 the condition illustrated is at a point in the cycle of rotation where the flapping angle is also at or near zero, in other words the blade may be considered in a position along the mean coning angle. In this position the mean pitch is adjusted to the desired attitude according to the position of the pitch control cap 73. The mean pitch of the blade 14 may be positive, zero, or negative for the desired adjusted attitude. In the illustration in these figures the actual mean pitch is positive. In this point of the cycle of rotation the pivot 79 of the link 78 is illustrated at about midway between the ends of the arcuate slot 77 of the arm 76.

In the position shown in Figures 18 and 19 the blade 14 is shown with the flapping angle at maximum positive, namely somewhat beyond the point where the tendency to flap upwardly is the greatest for normal flight conditions. The arm 76 is pulled up and its arcuate slot 77 through the link pivot 79 turns the ring 74 in contraclockwise direction, viewing Fig. 17, until the link pivot 79 is at the lower end of said slot 77. The shifting of the position of the link pivot 79 pushes up the link 78 so as to decrease the pitch of the blade 14 and decrease its lift.

In the position shown in Figures 20 and 21 the blade 14 is shown with the flapping angle at maximum negative. The dropping of the spar 11 lowers the arm 76, and the slot 77, and through the link pivot 79 turns the ring 74 in clockwise direction, viewing Fig. 20. This shifting of the position of the link pivot 19 pulls the link 78 so as to pull the trailing edge of the blade 14 down and increase the pitch angle and the lift of the blade 14.

It is to be understood that the extreme conditions illustrated in Figures 18 to 21 are merely illustrative, because in practice the initial change of the flapping angle of the blade and its spar automatically act to adjust the angle of incidence of the respective individual blade to counteract the tendency for such change normally before the blade would reach the extreme positions of these illustrations and would reduce such cyclic changes to a minimum within a comparatively small range. It is to be also understood that the structure herein shown is illustrative of one embodiment of my invention. The same control may be accomplished by variations of this mechanism, for instance the link 78 may be connected to the leading edge of its blade and the slot 77 remaining as herein described, the control is performed as herein described, but the extremes of pitch then become greatly increased. The changing of the curvature of the slot 77 will also modify the resulting pitch changes so as to afford an infinite choice of intermediate and extreme angles adaptable to design requirements.

The pitch of the counter-torque tail rotor 6 is adjusted by and with the adjustment of the pitch of the main rotor blades 14. The tail rotor in the herein illustrative embodiment is shown in the tail of the fuselage and rotates substantially in a plane parallel with and on the longitudinal or fore and aft axis of the aircraft. The tail rotor may be located outside the fuselage or inside the fuselage in other positions, and have more blades than shown, yet it may be controlled in the manner herein described. A gear box 86, containing a suitable transmission not shown, is mounted on a torque tube 85 secured on the frame of the aircraft. A transmission shaft 87 extended through said torque tube 85 transmits rotation to the gears in said gear box 86 from the engine or power unit of the aircraft. A rotor shaft 88 extends from the gear box 86 transversely of the tail. From the end of this rotor shaft 88 extend radially a plurality, in this instance two spars 89. On each spar 89 is rotatably mounted an airfoil blade 91. The tail rotor as shown rotates in a hole 90 formed transversely through the fuselage near its tail so that it exerts a turning force about the main rotor axis substantially equal and opposite to the turning force exerted on the aircraft by the main rotor driving torque around the axis of the main rotor shaft 31. The thrust of this tail rotor 6 is adjustable by changing the pitch of its blades 91. In the herein illustration, as shown in Fig. 4, the main rotor is rotated in clockwise direction when viewed from below the rotor, and the tail rotor is also rotated in clockwise direction viewing the same figure. The tail rotor shaft 88 has keyed on it a pitch control cap 92 which latter is rotatably held on a sliding collar 93 on the housing of the gear box 86. On a bracket 94 extended from the gear box 86 is fulcrumed a bell crank 96, an arm of which engages a pin 97 on the sliding collar 93 so as to slide said collar 93 and the cap 92 toward or away from the tail rotor blades 91. A control link 98 is pivoted at one end to the cap 92 and at its other end to one of the tail rotor blades 91 near the trailing edge of the latter. Each blade 91 has its own link 98 thus connected to the pitch control cap 92. The other arm of the bell crank 96 is connected by a suitable flexible push-pull cable 99 to a bell crank arm 101 extended from the main rotor pitch control lever 64 as shown in Fig. 4.

The adjustment of the pitch on the tail-rotor simultaneously with and by the pitch adjustment of the blades of the main rotor is accomplished by the movement transmitted through the flexible push-pull cable 99 from the bell crank arm 101 of the main rotor pitch control lever 64 to the bell crank 96. When the mean pitch of the main rotor blades 14 is descreased by turning the turn screw 69 so as to move the arm 66 in the pylon bracket 67 toward the rotor 2, the fulcrum of the main adjusting lever 64 is moved toward said main rotor 2. The shifting of the fulcrum of the control lever 64 carries with it the bell crank arm 101 and pulls the push-pull cable 99, which latter pulls the arm of the tail bell crank 96 and turns said bell crank 96 in a contra-clockwise direction viewing Fig. 5. The other arm of the tail bell crank 96 pulls the sliding collar 93 away from the tail rotor and pulls the cap 92 therewith so that the link 98 pulls the trailing edge of the airfoil blade 91 and decreases its mean pitch. When the pitch of the main rotor blades 14 is increased by shifting the lever 64 away from the rotor 2, then the bell crank 96 is turned in clockwise direction viewing Fig. 5 and the sliding collar 93 is pushed to increase the pitch of the tail rotor blades 91.

When the pylon of the main rotor 2 is tilted as shown in Fig. 4, and the pitch of the main rotor blades 14 is increased by reason of the turning of the lever 64 around its fulcrum, then the bell crank arm 101 of the lever 64 is turned contra-clockwise around the lever fulcrum as shown in Fig. 4, and pulls the push-pull cable 99 to turn the tail bell crank 96 also in contra-clockwise direction pulling the sliding collar 93 to decrease the pitch of the tail rotor blades 91. When the pylon of the main rotor 2 is returned to its straight position, or tilted rearward from its straight position, the lever 64 and its arm 101 are rocked in clockwise direction, viewing Fig. 4, and the sliding collar 93 is pushed to increase the pitch of the tail rotor blades 91. The adjustment of the pitch of the tail rotor blades 91 oppositely to the pitch variation of the main rotor blades 14 during the forward tilting of the pylon is necessary because the increase of pitch of the main rotor blades 14 is required to accommodate the increased air velocity through the rotor 2, but the forward tilted position of the pylon decreases the torque exerted about the vertical axis of the aircraft by the main rotor 2, hence the required counter-torque force about its axis is also decreased correspondingly and is accomplished by the automatic adjustment last described.

Figure 8:
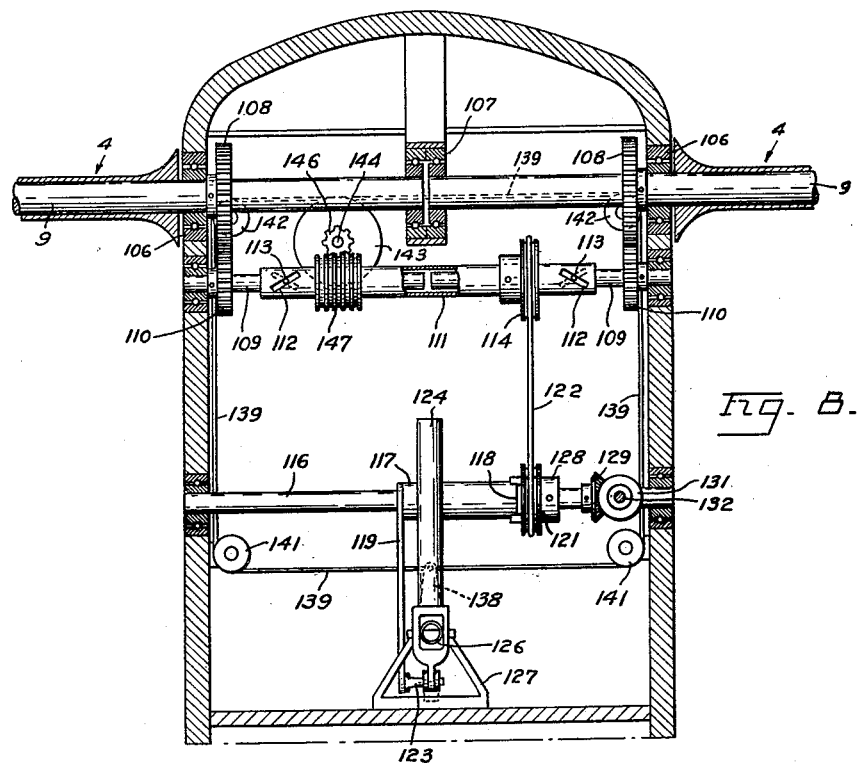
Fig. 8 is a partly sectional view showing wing control mechanisms in the aircraft.
Figure 9:
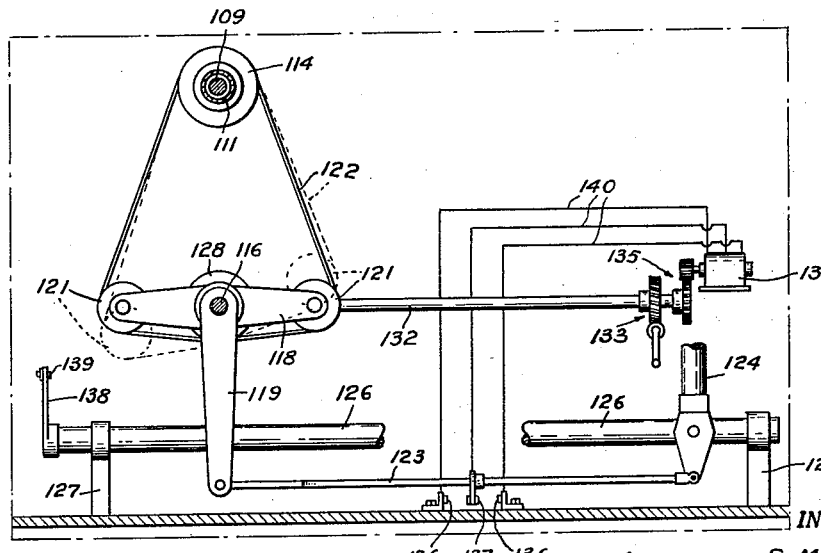
Fig. 9 is a partly sectional and partly diagrammatic view showing a side view of said wing control mechanisms.

For the manipulation and adjustment of the angle of attack of the wings 4 several types of mechanisms may be used according to the type of wing control desired. In Figures 8 and 9 the wings are used both as sustaining surfaces and as ailerons. Each wing 4 is fixed on its spar 9 which spar is located substantially along a line suitably relationed with the center of lift of the wing so that the rotational forces about the spar are easily controlled. Each spar 9 extends into the fuselage and is supported in anti-friction bearings 106 and 107 respectively in the side of the fuselage and on the aircraft frame near the center of the fuselage. Each spar 9 has a gear 108 thereon adjacent the inside wall of the fuselage. A pair of aligned shafts 109 extend below and parallel with the inner ends of the spars 9. The outer end of each shaft 109 is journaled in the fuselage. The inner portions of both shafts 109 are positioned in a sleeve 111. In this illustration the sleeve 111 has a pair of converging slots 112 on each side thereof and pins 113 extend from the shafts 109 into the slots 112. Each shaft 109 has a gear 110 thereon in mesh with the adjacent gear 108 of the spar 9. When the sleeve 111 is rotated, the shafts 109 rotate in the same direction and through the respective gears 110 and 108 rotate the spars 9 and the wings 4 in the same direction to adjust the angle of attack of the wings 4. In this illustration the sleeve 111 is rotated by a drum 114 fixed on said sleeve 111. Spaced beneath the shafts 109 and parallel therewith is a transverse shaft 116 extending across the fuselage and journaled as shown, in the opposite sides of the fuselage. On this transverse shaft 116 is a T-crank sleeve 117 from which extend side arms 118 and a leg 119. The T-crank arms 118 extend fore and aft with respect to the aircraft. A sheave 121 is journaled near the extremity of each T-crank arm 118 and substantially in the plane of the drum 114. A cable 122 is played around the sheaves 121 and the drum 114 so that when the T-crank is rocked the lowering of one sheave 121 and the raising of the other sheave 121 shortens the cable 122 over one sheave and correspondingly lengthens it over the other sheave, and rotates the drum 114 in the same direction as the direction of rocking of the T-crank. The leg 119 of the T-crank is connected by a rod 123 to the lower end of a usual control stick 124 fulcrumed on a torque tube 126 which latter extends fore and aft of the aircraft and is journaled in suitable bearing brackets 127 in the aircraft. Thus by pushing the control stick 124 forward the T-crank leg 119 is pulled aft, and the drum 114 is rotated in contra-clockwise direction viewing Fig. 9, and the wings 4 are rotated so as to raise the trailing edges of the wings 4 and decrease the angle of attack of said wings 4. By pulling the control stick 124 aft the T-crank leg 119 is pushed forward and the T-crank is rocked to turn the drum 114 and the wings 4 in a direction opposite to the last described direction and the angle of attack of the wings is increased.

In the event it is necessary to turn the wings 4 more than the usual manipulation, or for adjusting the wings 4 for the various relative angles of attack with respect to the main rotor 2 as described in the first part of this description, the turning is accomplished through another drum 128. This adjusting drum 128 is keyed on the transverse shaft 116, and it frictionally engages the cable 122 for spinning it when the adjusting drum 128 is rotated. The transverse shaft 116 has a bevel gear 129 near an end thereof in mesh with a drive gear 131. A torque shaft 132 rotates the drive gear 131. On the end of the torque shaft 132 near the pilot or operator is a geared crank 133 by which the torque shaft 132 can be rotated manually so as to rotate the adjusting drum 128 and spin the top drum 114 to any degree desired. Thus the wings 4 can be rotated or adjusted through 360 degrees if desired. For automatic rotation of the torque shaft 132 and of the adjusting drum 128 hydraulic or electric or other suitable devices may be provided. In the present illustration an electric motor 134 is mounted on the aircraft frame at the end of the torque shaft 132 and is coupled to the torque shaft 132 by suitable gears 135 for rotating it in opposite directions. This electric motor 134 is reversible and is connected by suitable electric lines indicated at 140 to spaced circuit breaking contacts 136 beneath the control rod 123. A contact finger 137 of the same circuit is carried on the rod 123 and is located between the circuit breaker contacts 136. When the control stick is pushed forward or pulled back to the limit of the usual manoeuvre control and further rotation of the wings 4 in the respective directions is required, then the finger 137 held in contact with the respective circuit breaker contact 136 closes the circuit of the motor 134 and rotates the motor 134 in the respective direction and rotates the wings 4 in the manner heretofore described as long as the control stick 124 is held in said circuit closing position. When the desired adjustment of the wing angle is reached the control stick is moved from the circuit closing position and thereafter the limited manoeuvring wing adjustments can be accomplished by the usual manipulation of the control stick 124 within the practical limits of the space between the circuit breaker contacts 136. This manner of wing control permits the easy and quick manipulation of the wings 4 both for manoeuvring and for adjustments of the wings to the various attitudes with respect to the rotor 2. This control is achieved without the need for impractical dimensions or great manual force on the control stick.

For differential aileron action by the wings 4 an arm 138 is extended from the control stick torque tube 126, so as to rock toward the port or starboard side of the aircraft when the torque tube 126 and the control stick 124 are rocked sidewise in the usual manner for differential lift adjustments of the wings 4. To the arm 138 is fastened a cable 139 which is played around sheaves 141 at the opposite sides of the fuselage, and then upwardly along the sides of the fuselage and over another set of opposite sheaves 142 inwardly of the fuselage above the short shafts 109. The cable 139 at the top is played around a cable drum 143 on a shaft 144 extending above and at right angles of the sleeve 111. This shaft 144 is suitably journaled on the vehicle frame and the drum 143 is keyed to the shaft 144. On the shaft 144 is a pinion 146 directly above the sleeve 111. A cylindrical rack 147 is keyed on the sleeve 111 so that when the pinion 146 is rotated the rack 147 and the sleeve 111 are moved axially on the shafts 109. Inasmuch as the slots 112 on each side of the sleeve 111 are converging the axial shifting of the sleeve 111 and the slots 112 will force the shafts 109 to rotate in opposite directions to each other by reason of the forcing of the pins 113 of the respective shafts 109 in opposite directions by the oppositely inclined slots 112. Thus by rocking the control stick 124 to one side or the other, the torque tube 126 is rocked which in turn rocks the arm 138. The arm 138 moves the cable 139 over the sheaves 141 and 142 and the cable 139 rotates the drum 143 and the pinion 146. The pinion 146 moves the cylindrical rack 147 and the sleeve 111 axially in the respective directions, and the sleeve slots 112 force the pins 113 of the respective shafts 109 in opposite directions to each other. The shafts 109 transmit through the gears 110 and 108 the differential rotation to the spars 9 and the wings 4. In this manner aileron control is easily performed through the use of the wings. The shafts 109 function as elements of the differential control and co-ordinated control of the wings yet do not interfere with either means of control.

In the form of the wings shown in Figures 10 to 13 inclusive, flaps 148 and 149 are provided respectively for rolling and diving control. These flaps 148 and 149 are suitably hinged near the trailing edges of each wing 151. Each wing 151 is fixed on a hollow spar 152 which is held in combined radial and thrust bearings 153 in the side of the fuselage and at the inner end of the spar 152 above the center of the fuselage. Each wing 151 is held in adjusted attitudes and against rotation by a releasable brake mechanism shown in Figures 12 and 14. A brake drum 154 is fixed to each hollow spar 152 in a suitable manner, such as by set screws 156. Each brake drum 154 is adjacent to the nearest side of the fuselage. A brake-band 157 surrounds the brake drum 154. A brake-band lever 158 is fulcrumed at 159 in the side of the fuselage and both ends of the brake-band are suitably connected to the brake band lever 158 so that when the lever 158 is pulled the ends of the brake-band are pulled in opposite directions and the band 157 tightly binds the drum 154. The lever is suitably connected by a cable 161 to a brake control lever mechanism 162 of a suitable type located on the side of the fuselage conveniently near to the pilot. By setting the brake control lever mechanism 162 for tightening the brake-band 157 the spar 152 is held against rotation and the wing 151 is held in its adjusted attitude.

The driving flap 149 is controlled and manipulated through a tube 163 axially slidable in the spar 152. On the outer end of the tube 163 is a side arm 164 which extends through a suitable slot through the side of the hollow spar 152. A link 166 connects the end of this arm 164 to a bell crank 167 fulcrumed in the wing 151. A rod 168 is connected to the other end of the bell crank 167. The rod 168 extends from the wing at an incline toward the trailing edge and out through the bottom surface of the wing 151 and to the underside of the hinged edge of the aileron flap 149 and there it is pivoted to an aileron horn 169. As the control tube 162 is shifted axially in the hollow spar 152 it rocks the bell crank 167 which moves the control rod 168 and the force transmitted through the horn 169 turns the flap 149 up or down according to the direction of control, and thus adjusts the angle of the flap 149 for diving or climbing. The control tube 163 is shifted by the usual manipulation of a control stick 171, the lower end of which is connected through a fore and aft rod 172 to a crank 173 on a transverse torque tube 175 in the fuselage. A control rod 174 extends from a lever arm at each end of the torque tube 175 to a forked bell crank 176 which latter is fulcrumed on the aircraft frame near each spar 152. The forked arm of the bell crank 176, as shown in Fig. 14, engages pins 178 on a housing ring 179. The control tube 163 has a head 181 on its inner end. Studs 182 are extended radially from the head 181 and through slots 177 in the sides of the spars 152 and carry the inner race of a thrust bearing, the outer race of which is held in said housing ring 179, so as to allow the rotation of the control tube 163 with the spar 152 yet maintain the operative connection with the forked bell crank 176. Through this mechanism the control tube 163 can be shifted for moving the flap 149 for climbing or diving attitudes respectively by pulling back or pushing forward the control stick 171. The motion of the control stick 171 is transmitted through the rod 172, to the crank 173 and then to the control rods 174 to the forked bell cranks 176 and to the heads 181 of the control tubes 173 in both spars 152, and then through the respective side arms 164 of the tube 163 and the wing bell cranks 167 to the rods 168 and to the horns of the flaps 149 to turn the respective flaps 149 in the respective directions above or below the plane of the wings 151. The controls for both diving flaps 149 are identical.

For the control of each rolling flap 148 a control rod 184 is extended through and beyond the outer end of the control tube 163. A side arm 186 extends from the outer end of the control rod 184 through a suitable slot through a side of the hollow spar 152 and is connected by a link 187 to a bell crank 188 in the wing 151. A rod 189 transmits the movement of the bell crank 188 to a horn 191 on the under side of the rolling flap 148. The shifting of the control rod 184 axially outward or inward respectively turns the rolling flap 148 below or above the plane of the wing 151. The control stick 171 is pivoted transversely on a rolling control torque tube 192 which latter is journaled in suitable bearing brackets or pillow blocks 193. For diving or climbing the control stick is pushed forward or aft around its pivot. For rolling control the control stick 171 is rocked to one side or the other so as to turn the torque tube 192. Cross arms 194 extend to opposite sides of the torque tube 192. A rod 196 extends from each arm 194 upwardly to a forked bell crank 197. The forked bell cranks 197 have their respective inner lever arms extended toward the center of the aircraft. The forked end of each bell crank 197 is connected to the adjacent control rod 184 in the same rotatable manner heretofore described in connection with the forked bell cranks 176 on the control tubes 173. When the control stick 171 is rocked to one side it turns the torque tube 192 which in turn moves the cross arm 194 on one side downwardly and on the other side of the torque tube 192 upwardly so as to operate the forked bell cranks 197 oppositely to each other so that the control rod 184 in one spar 152 is pulled inwardly of the aircraft and the control rod 184 of the other spar 152 is pushed outwardly. Through the outer bell cranks 188 and the rods 196 the rolling flaps 148 are operated in opposite directions to each other, namely when one rolling flap 148 is turned upwardly with respect to the plane of its wing 151 the other rolling flap 148 is turned downwardly with respect to the plane of its wing 151.

By the manipulation of the control stick 171 both diving or climbing and rolling control is accomplished without the exertion of great force. In order to rotate the wings 151 to the various adjusted attitudes with respect to the main rotor 2, the brake 154 is released in the manner heretofore described. The spars 152 thus being freed, the wings 151 are turned to assume their most efficient attitude for balanced flight condition. When it is necessary to turn the wings 151 to selected angles then the flap controls are manipulated while the spar 152 is free and the wings 151 are turned by the turning moment exerted thereon by the flaps 148 and 149 respectively and the desired optimum angles of attack and attitude of the wings 151 is adjusted. Then by tightening the brake on the brake drum 154 the wings 151 are fixed in the adjusted position and normal flight control is obtained by manipulating the control stick 171 as heretofore described.

In Fig. 15 is shown a wing 198 with a single flap 199 used both for diving-climbing and rolling control. The control mechanism from the control stick to the outer ends of the control tube 163 and control rod 184 is the same as heretofore described in connection with the double flap structure. The single rod 201 extended from the horn of the flap 199 inwardly of the wing and toward the spar 152 is connected to the diving control bell crank 167 by a curved link 202 and to the rolling control bell crank 188 by a straight link 203. The manipulation of the control stick either for rolling or diving or climbing is the same as heretofore described with respect to the double flap structure and is transmitted to the flap 199 through the same rod 201. When both diving or climbing and rolling control forces are applied simultaneously by both pushing or pulling and sidewise rocking of the control stick, the proper differential rolling moment of the flaps 199 on the opposite wings 198 is determined by the differential action of the diving or climbing adjustment of the flaps 199 on the opposite wings 198. In other words the flap 199 on one wing 198 will be turned to a different degree than the flap 199 of the other wing 198 according to the rolling control rocking of the control stick.

It is to be noted that the mechanisms and controls herein described may be used in connection with wings of different types. For instance the wings may be set at an angle of dihedral with respect to the fuselage so as to impart stabilizing influence about the rolling axis and in side slip; or the wings may be given an angle of sweepback so as to locate their respective centers of lift at a more propitious point with respect to the center of gravity than might otherwise be possible due to structural reasons or to interference of their root sections with the main rotor drive mechanism and with the fuselage. The wings being controllably pivoted about a span axis transverse to the fore and aft axis of the fuselage may be adjusted by any of the methods heretofore described to any angle relative to the fuselage axis through 360 degrees, if desired, and thus assume any desirable relation to the main rotor and to the counter-torque mechanism to correspond to the many flight attitudes of the aircraft. The wings being controllable differentially to one another so that the half on one side of the fuselage may assume a different angle rotationally than its mate on the opposite side, give a controllable rolling moment about the longitudinal fuselage axis under conditions approaching or in horizontal flight, or give a yawing moment about the rotor axis under conditions approaching, or in, vertical climb, vertical powered descent, and hovering. The wings can be controlled so as to rotate together about their axis, or differentially, through the mechanisms and linkages heretofore described by means of the pilot's control stick, or by other suitable means of control such as an automatic pilot. The type of wings having ailerons on their trailing edges may be free to rotate by the force of relative wind as does a weather cock, except that by means of the flaps the lift on each wing can be controllably varied either together or differentially. These wings may be also locked at will against rotation about their axis in any adjusted attitude, but leaving the flaps free for control movement. In this manner the craft may be trimmed and become dynamically stable through a considerable range of powered flight conditions. It is preferable that the coaxially mounted wings have their common axis on a line lying substantially in or close to the mean aerodynamic center of the chosen wing section, so that the reaction from the air forces on the wings is directed substantially through the center of support of the wing itself and in this manner the size of the resulting control stick force necessary to counterbalance the air forces and to manoeuvre the wings is the minimum under all flight conditions. The wings may be designed to take controllably any part of the lift of the craft during powered or unpowered flight. Because of this flexibility of wing control it is not necessary to continually alter the effective tilt of the main rotor; it may be set to any desired angle of tilt, and for all conditions of flight above the stalling velocity of the wing it may be left there. The elimination of necessity for varying continually the effective angle of rotor tilt for small changes of flight conditions results in considerable simplification in the rotor controls over that of the helicopters and rotating wing type aircrafts heretofore used. The greater the angle of tilt of the rotor in the relative wind, the greater is the percentage of total engine power available for propulsion because the adjustable wings can absorb the torque in the vertical plane and the vertical tail surface the torque in the horizontal plane, and the resulting decrease of power required by the counter-torque means can be inversely directed into the main rotor drive.

By the adjustability of the main rotor and the coordination of its tilt with the counter-torque means and the corresponding adjustment and manipulation of the wings and rudder by their controls, the aircraft is positively held an easily controlled in any adjusted attitude. In the condition of hovering flight, vertical climb or vertical descent with power the rotor is normally not tilted and the center of thrust passes nominally through the center of gravity of the craft, while the wings are feathered into the relative wind; however, the wings may be controllably tilted forward or back from the feathered position which will result in a corresponding tendency of movement of the entire craft. If the wings are differentially tilted, the craft will tend to turn about the rotor axis. If one wing is feathered and the other is set nominally broadside to the relative wind, a rolling moment will be induced which will automatically tilt the rotor and the craft together and which will result in a component of thrust normal to the fuselage axis for controlled side slip. As the rotor is tilted forward for translational movement, the percentage of relative wind velocity which will pass through the disc of rotation of the rotor will vary directly as the sine of the angle between the relative wind and the plane of rotation of the rotor, becoming a unity when the rotor rotates in a plane normal to the relative wind; therefore the angle of pitch of the rotor blades is varied, in the manner heretofore described, in the same proportion for greatest propulsive efficiency. This varying of the blade pitch is performed automatically by the tilting of the rotor as heretofore described. As the tilt of the rotor increases, the proportion of rotor torque in the horizontal plane, which must be overcome by the counter-torque means consisting of either the tail rotor, or the vertical tail surface, or both in combination, will vary directly as the cosine of the angle between the fuselage axis and the plane of rotation of the main rotor, becoming zero when the rotor rotates in a plane normal to the fuselage axis. At this time all the rotor torque is in the vertical plane and may be absorbed by differential wing lift. The connection between the rotor blade pitch control and the pitch control of the counter-torque rotor automatically changes the counter-torque thrust proportionately to the variation of the torque by reason of the tilting of the main rotor. The initial adjustment of the mean pitch of the blades of the main rotor for any given attitude is performed by the manual pitch control heretofore described through the range necessary to give hovering, autorotation and negative thrust. It is however not necessary that the blade pitch be continually altered to maintain aerodynamic control of the craft, because the relations between the relative wind direction and velocity, rotor tilt and fuselage axis inclination and the other controls herein described can be used to maintain such control without additional manual changing of the blade pitch. For instance when the mean pitch of the blade has been set for hovering then all further adjustments of the pitch may be introduced by change of rotor tilt over a wide range of flight conditions and speeds. The actual speed of flight in any attitude is controlled in the usual manner by the power applied from the engine of the aircraft. The usual methods of connecting or disconnecting automatic pilots or the like to the various controls herein described are equally applicable herein as in other types of aircrafts.

I claim:

1. In an aircraft, wing spars rotatably mounted on the aircraft and extended into said aircraft, wings on said spars, control shafts rotatable in the aircraft, transmission means to connect each control shaft to an adjacent spar for rotation and for holding the spar in adjusted position, an operating element mounted on said shafts for rotation with said shafts and being slidable axially on said shafts, connecting means between said element and said shafts for rotating said shafts with said element and for converting the axial sliding motion of said element into differential rotation of said shafts oppositely one to the other, and a control mechanism for rotating and sliding said elements on said shafts, said control mechanism including oscillating actuating members, means to convert oscillation of said members in opposite directions into rotation of said element in opposite directions respectively, a rocking member mounted for rocking selectively in opposite directions, means to convert the rocking of said rocking member into sliding motion of said slidable element on said shafts, and means for oscillating said oscillating members and for rocking said rocking member.

2. In an aircraft, wing spars rotatably mounted on the aircraft and extended into said aircraft, wings on said spars, control shafts rotatable in the aircraft, transmission means to connect each control shaft to an adjacent spar for rotation and for holding the spar in adjusted position, an operating element mounted on said shafts for rotation with said shafts and being slidable axially on said shafts, connecting means between said element and said shafts for rotating said shafts with said element and for converting the axial sliding motion of said element into differential rotation of said shafts oppositely one to the other, and a control mechanism for rotating and sliding said elements on said shafts, said control mechanism including oscillating actuating members, means to convert oscillation of said members in opposite directions in rotation of said element in opposite directions respectively, a rocking member mounted for rocking selectively in opposite directions, means to convert the rocking of said rocking member into sliding motion of said slidable element on said shafts, and means for oscillating said oscillating members and for rocking said rocking member, a power drive connected to said rotative converting means, and means to actuate said power drive in selected directions in the respective extreme oscillating positions of said oscillating means.

3. In an aircraft, wing spars journaled in the aircraft, a wing on each spar, at least one aileron flap adjustably mounted on each wing, a releasable brake mechanism for each spar to hold said spar in adjusted position, a rolling control element extended through each wing and being connected to the aileron flap on said wing for adjusting the angle of said flap with respect to said wing, a diving control element extended through each wing and connected to the aileron flap of said wing for adjusting the angle of said flap for diving and climbing, and a control device in said aircraft for operating said rolling control elements for opposite adjustments of the flaps on the respective wings for rolling attitude of the aircraft, and for operating said diving control elements in the same direction to adjust said flaps for diving and climbing attitudes of the aircraft, said wings and spars being freely rotatable according to the aileron flap adjustments when said brake mechanism is released.

4. In an aircraft, hollow wing spars journaled in the fuselage of the aircraft, a wing fixed on each spar, at least one aileron flap adjustably mounted on each wing, a releasable brake mechanism holding each spar against rotation, a rolling control element extended through each spar from the aircraft fuselage outwardly in the wing, means to connect said control elements to the aileron flap on each wing to convert axial movements of said control elements into angular adjustments of the aileron flap on each wing, a control member extended through each spar from the fuselage outwardly, means to connect each control member to the flap on the adjacent wing to convert axial movement of said control member into angular adjustments of the flap, and a control device in the aircraft for selectively moving said control elements to adjust the aileron flaps on the wings oppositely to one another, and for selectively moving the control members to adjust said flaps on the wings in the same direction, said wings and spars being freely rotatable around said control elements and said control members when said brake mechanism is released.

ALEXANDER S. MULLGARDT.

REFERENCES CITED

The following references are of record in the file of this patent:

UNITED STATES PATENTS

| Number | Name | Date |
|---|---|---|
| 1,761,444 | Jones | June 3, 1930 |
| 1,951,817 | Blount | Mar. 20, 1934 |
| 1,672,276 | Nordberg | June 5, 1928 |
| 1,806,927 | Aldrich | May 26, 1931 |
| 1,861,219 | Longren | May 31, 1932 |
| 1,877,003 | Meng | Sept. 13, 1932 |
| 1,806,648 | Salisbury et al. | May 26, 1931 |
| 1,825,115 | Hicks | Sept. 29, 1931 |
| 999,992 | Harris | Aug. 8, 1911 |
| 1,405,643 | Weaver | Feb. 7, 1922 |
| 1,775,861 | Lehberger | Sept. 16, 1930 |
| 1,801,184 | Yost | Apr. 14, 1931 |
| 2,230,370 | Baynes | Feb. 4, 1941 |
| 1,409,850 | Haney | Mar. 14, 1922 |
| 1,704,719 | Bess | Mar. 12, 1929 |
| 2,070,686 | Rutherford et al. | Feb. 16, 1937 |
| 2,256,635 | Young | Sept. 23, 1941 |
| 2,321,572 | Campbell | June 15, 1943 |
| 2,396,038 | Bossi | Mar. 5, 1946 |
| 2,381,968 | Bossi | Aug. 14, 1945 |